Oct. 11, 1966 H. J. VAN DOLAH ETAL 3,278,284
METHOD FOR MANUFACTURING PORCELAIN ENAMEL FRIT
Filed July 22, 1964 3 Sheets-Sheet 1
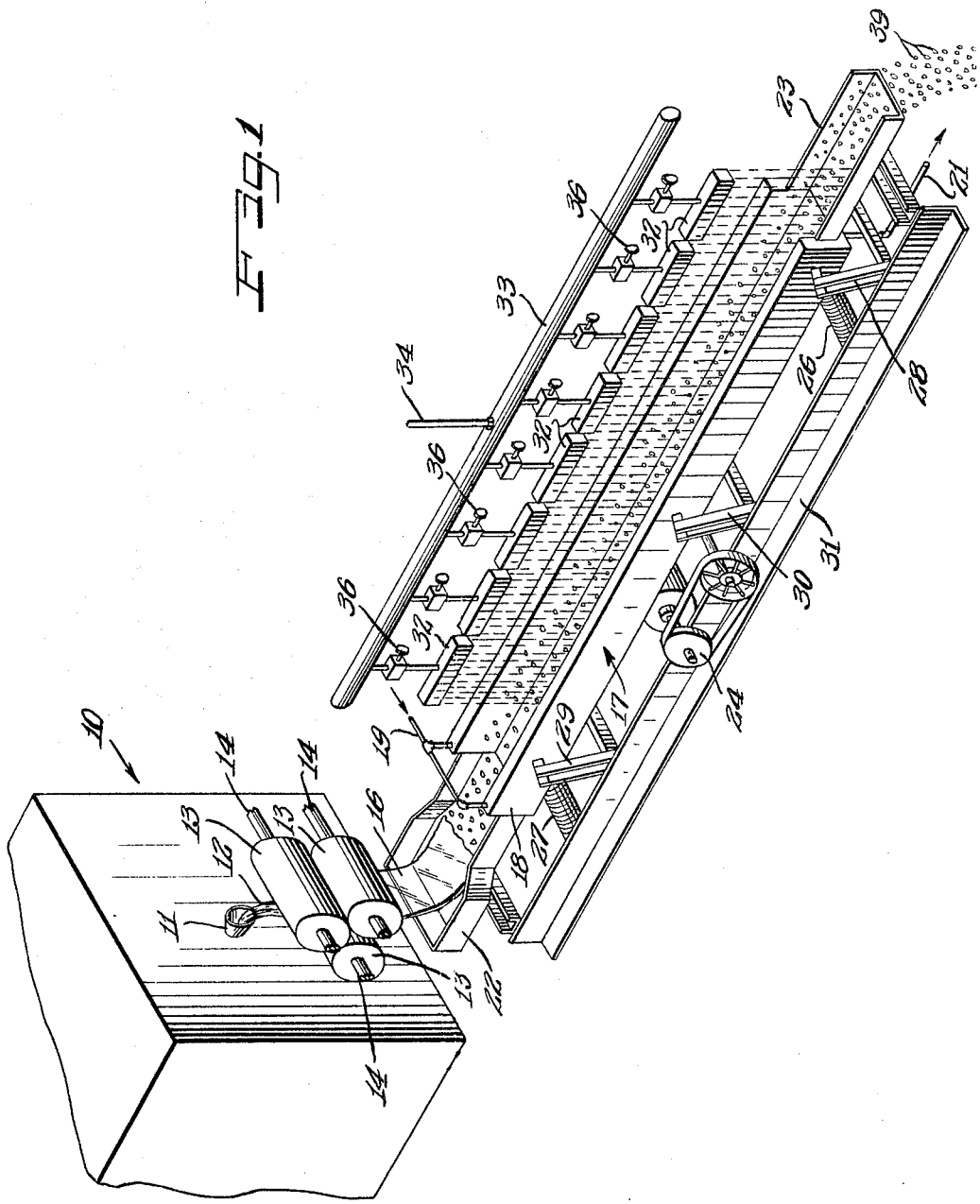
INVENTORS
Harry J. Van Dolah
Otto C. Linhart
Arthur Kiefer
BY
ATTORNEYS

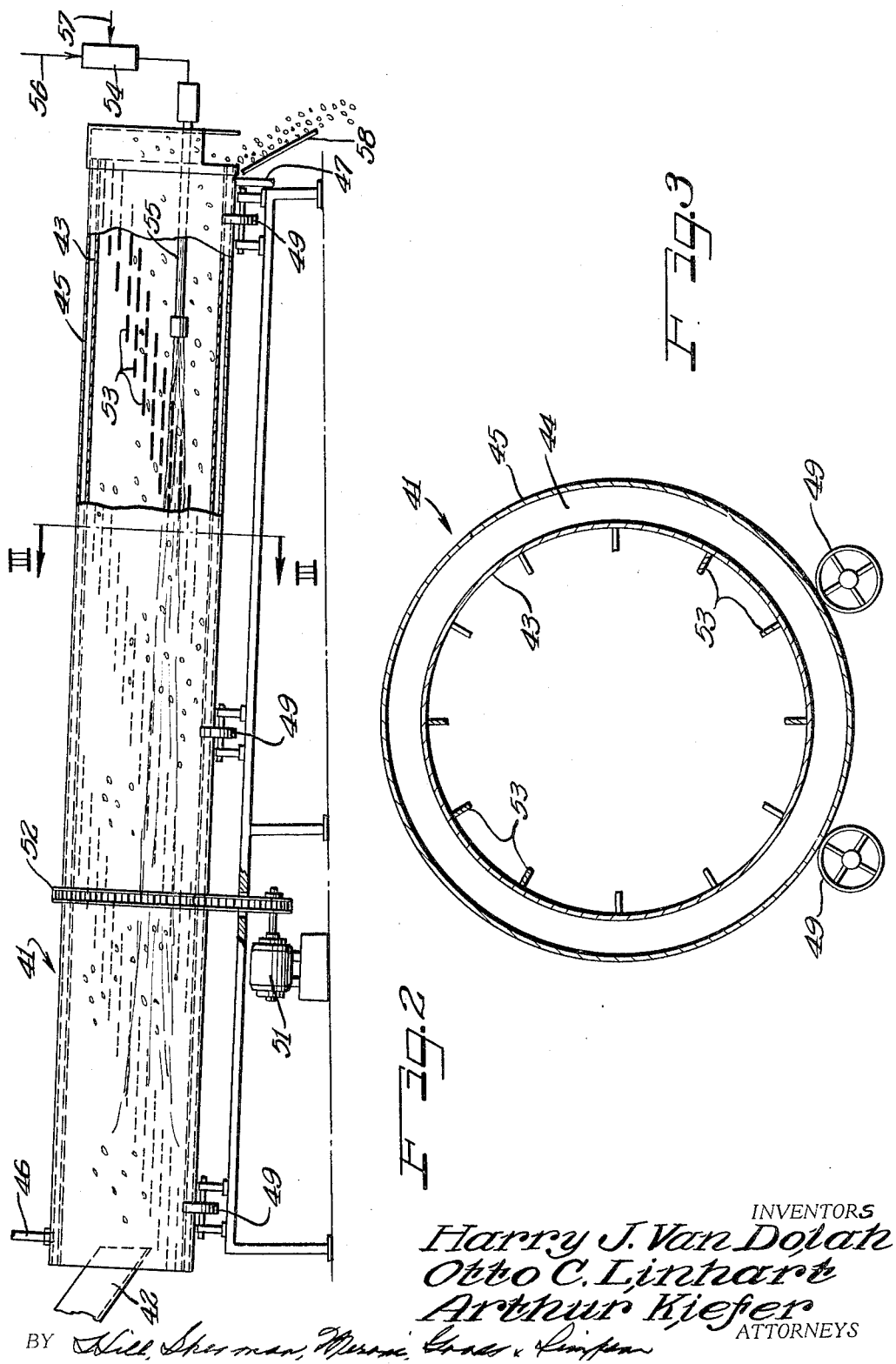

Oct. 11, 1966 H. J. VAN DOLAH ET AL 3,278,284
METHOD FOR MANUFACTURING PORCELAIN ENAMEL FRIT
Filed July 22, 1964 3 Sheets-Sheet 3

INVENTORS
Harry J. Van Dolah
Otto C. Linhart
Arthur Kiefer
BY
ATTORNEYS

United States Patent Office 3,278,284
Patented Oct. 11, 1966

3,278,284
METHOD FOR MANUFACTURING PORCELAIN ENAMEL FRIT
Harry J. Van Dolah, Wheaton, Otto C. Linhart, Cicero, and Arthur Kiefer, Lombard, Ill., assignors to The Eagle-Picher Company, Cincinnati, Ohio, a corporation of Ohio
Filed July 22, 1964, Ser. No. 384,509
3 Claims. (Cl. 65—21)

The present invention relates to methods and apparatus for producing improved porcelain enameling frit, particularly suitable for use in dry process enameling.

One of the most common enameling procedures involves the application of a dry enameling frit onto a hot casting or other heated metal surface so that the heat of the metal and the heat from the subsequent firing operation fuses the frit into a uniform film of enamel which readily bonds itself to the underlying surface when the enameled article is cooled. To produce a white color in the enamel, it is common to incorporate either an antimony or zirconium opacifier into the composition and to apply sufficient amounts of such opacified frit to produce a coating on the order of 40 to 50 mils in thickness. In addition to requiring reasonably thick coatings, the use of antimony and zirconium opacifiers suffers from the further disadvantages that the antimony enamels have low reflectance and the zirconium enamels are not acid resistant.

Some attempts have been made to use titanium dioxide because of its extremely high index of refraction, which results in better hiding power and higher opacity. While this material can be handled reasonably well in a wet process of application, the conventional method for opacifying frit with titanium dioxide leaves much to be desired when such compositions are used in the dry enameling process, particularly on cast iron. Titanium opacified enamels frequently produce a mottled appearance which is highly objectionable in the finished article. Furthermore, the color achieved in the enamel coating is not the desired bue-white cast but more often is yellowish. In addition, the reflectivity of the enamel surface is not as high as would be desired in high quality enameling.

To overcome the difficulties attendant to the use of titanium dioxide in dry process enameling frits, it was discovered that it was necessary to develop opacity instantaneously, or at least very rapidly. To accomplish this result, it has been suggested in a copending application, Serial No. 86,570, assigned to the same assignee as the present application, to subject the titanium frit to a preliminary heating cycle which may take place prior to or after the frit is milled and reduced to a powder. This heating cycle is sufficient to at least cause partial nucleation of titania in the frit so that upon application by the techniques of dry process enameling, the titanium dioxide is completely recrystallized under conditions which produce maximum whiteness and uniform opacity, without mottle.

The present invention is directed to improvements in methods and apparatus for carrying out the techniques broadly described in the aforementioned copending Serial No. 86,570. More specifically, the methods of the present invention involve forming a molten mass of glass containing a titania opacifier, cooling the mass to form a sheet or a ribbon of coherent frit at or near the solidification temperature, and then heat treating the coherent material at a temperature ranging from the softening point of the glass to about 600° F. above the softening point, for a time sufficient to cause formation of titania crystals in a matrix of glass. The heat treatment is carried out either while the solidified glass is still in the form of the ribbon, or after it is broken up into frit particles. In a particularly preferred embodiment of the invention, the heat treating is accomplished while the ribbon is being broken up into frit flakes on an oscillatory conveyor which periodically disperses the flakes and prevents them from sticking to the conveyor under the temperature conditions prevailing during the heat treatment.

One of the objects of the present invention is to provide a continuous method for the manufacture of improved titania opacified frit suitable for dry process enameling, starting with the molten glass in the smelter and ending up as frit particles suitable for packaging.

Another object of the present invention is to provide an improved method for the manufacture of opacified frit which involves a more efficient means of heat treating the frit to cause nucleation of the titania therein.

Still another object of the invention is to provide improved apparatus for the manufacture of titania opacified frit which can be used in conjunction with existing frit manufacturing facilities, without substantial modification.

Another object of the invention is to provide improved forms of apparatus for producing titania opacified frit directly from a glass smelter in a continuous manner.

Another object of the invention is to provide a continuous method for the manufacture of titania opacified frit particles, including a continuous grinding operation, to produce particles of a proper size for dusting on by the dry process.

Other objects and features of the present invention will become apparent to those skilled in the art from the following detailed description of the attached sheets of drawings in which:

In the drawings:

FIGURE 1 is a somewhat schematic view in perspective of a preferred form of apparatus employed in accordance with the present invention;

FIGURE 2 is a view in elevation, partly broken away, illustrating a rotary drum type arrangement which can be used as the heat treating means in the present invention;

FIGURE 3 is a cross-sectional view taken substantially along the line III—III of FIGURE 2.

Figure 4:
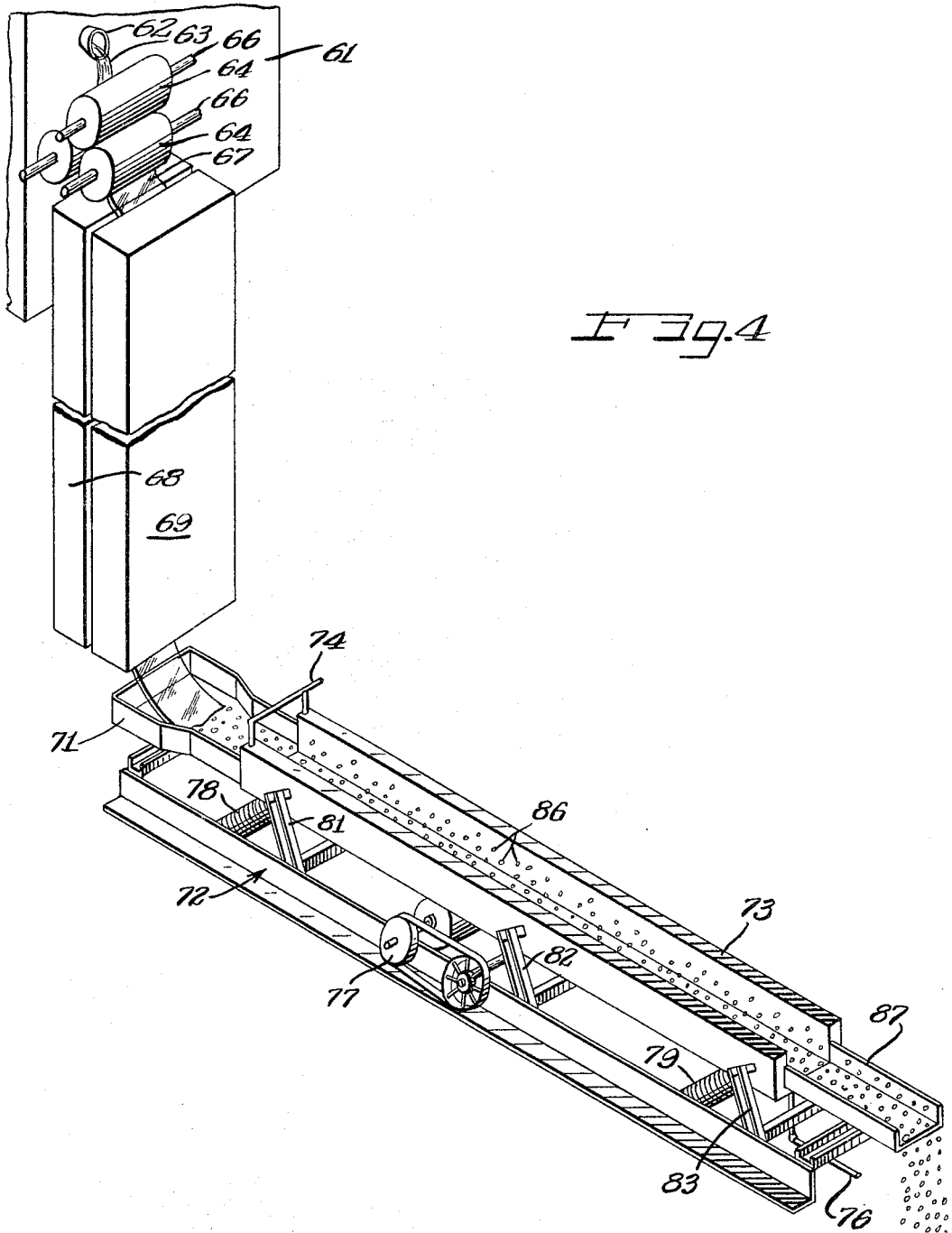
FIGURE 4 is another fragmentary view, in perspective, of a further modified form of apparatus which can be used in accordance with the present invention.

In FIGURE 1, reference numeral 10 indicates generally a glass smelting furnace provided with a discharge spout 11 from which a stream 12 of molten glass may issue. While the improved results of the present invention may be obtained with a wide variety of titania opacified compositions, a typical range of ingredients for a white titanium frit may include 20 to 55% by weight silica, from 8 to 24% by weight titania, from 5 to 25% by weight boric oxide, from 0 to 25% sodium oxide, from 0 to 25% potassium oxide, from 0 to 5% lithium oxide, from 0 to 5% zinc oxide, from 0 to 4% alumina, from 0 to 3% magnesia, from 0 to 5% phosphorus pentoxide, from 0 to 20% fluorine, and from 0 to 10% zirconia. With a composition of this type, the temperature within the smelter 10 may be on the order of 2500° F.

The stream 12 is solidified by contact with a plurality of rotating, water cooled quenching rolls 13 disposed adjacent the spout 11. The coolant is introduced through the rolls by means of suitable pipes 14. The quenching rolls 13 solidify the molten stream into a ribbon or strip 16 at a temperature ordinarily on the order of about 500° F. The ribbon 16 is then delivered to an oscillatory conveyor apparatus generally indicated at numeral 17 where the ribbon 16 is not only broken up into flakes or particles, but is heat treated as well to cause at least incipient crystallization of the titania crystals in the glass, while leaving the other glass forming ingredients in their normal vitrified condition.

The oscillatory conveyor 17 includes a water cooled trough 18 having a hollow interior in which cooling water is introduced through an inlet 19 and withdrawn through a discharge line 21 at the discharge end of the conveyor. A stainless steel receiving tray 22 is used to receive the frit sheet or ribbon 16 initially, and a stainless steel dispensing pan 23 at the opposite ends of the conveyor 17 is used to discharge the heat treated frit. In addition, the inner walls of the trough 18 may be lined with stainless steel. The conveyor 17 is given an oscillatory motion by means of a variable speed drive 24 which operates through a constant throw eccentric (not shown) to produce an oscillatory motion in the conveyor. A number of coil springs 26 and 27 support the conveyor mechanism and amplify the movement of the conveyor produced by a variable speed drive 24. A plurality of leaf springs 28, 29 and 30 are attached to the base of the conveyor 17, indicated at reference numeral 31, and to the trough 18 to stabilize the oscillatory movement of the conveyor mechanism.

Heat treating of the frit particles is accomplished through a heating means such as infrared heaters 32 arranged in a bank lengthwise of the path of travel of the frit along the conveyor 17. The infrared gas burners 32 are fed from a manifold 33 to which an air-gas mixture may be fed by means of an inlet line 34. Individual valves 36 are provided on each of the burner units to control the intensity of the gas flame emanating from each burner. While the illustrated example shows the use of gas burners, it should be evident that any heat source can be used, including oil fired burners, dielectric heaters, and ultraviolet heating assemblies.

As the ribbon 16 of frit is delivered to the oscillatory conveyor 17, the motion of the oscillatory conveyor breaks up the frit sheet 16 into particles 39 which are periodically dispersed into the surrounding air and, in dispersed condition, are heat treated by the flames emanating from the gas burners 32. This periodic dispersal serves not only to keep the frit particles 39 from sticking to the trough, but also to present all of the surfaces of the frit particles more uniformly to the heater of the heat treating zone.

The residence time of the frit particles 39 in the heat treating area should be such that the titania crystals have a chance to form within the glass matrix. Generally, this condition is manifested by the assumption of a milky color in the flakes characteristic of nucleation of titania crystals. Of course, the treatment time will vary with the treatment temperature, lesser times being used with higher temperatures, and vice versa. A typical temperature-time schedule consists of a heat treating temperature of 1200° F. maintained for a time of 1½ minutes.

The alternate form of the invention illustrated in FIGURES 2 and 3 of the drawings makes use of a different type of heat treating environment. In this form of the invention, the frit particles, preferably still hot from the smelter, are introduced into an inclined rotary drum 41 through a chute 42. The drum 41 consists of an outer shell 45 and a concentric inner shell 43, with an annular space 44 being provided therebetween. The annular space 44 is used for cooling purposes, and is fed with a coolant through an inlet pipe 46, and the discharge pipe 47 is provided at the other end of the drum for removing the circulating coolant. The drum 41 is mounted on spaced wheel guides 49, and is driven by means of a drive motor 51 and a chain 52.

The interior of the inner drum 43 is formed with a series of relatively short, staggered flights 53 which serve to carry the frit flakes during a portion of the rotation of the drum until such time as the angle of repose is exceeded, whereupon the frit particles are suspended in the air and settle to the bottom of the drum for further rotation therewith. The heat treatment is provided by means of one or more gas burners 55 located at the lower end of the drum, the gas burner being supplied from an air-gas mixer 54 fed by an air supply line 56 and a gas supply line 57, respectively.

Thus, as the frit particles or flakes are introduced into the upper inlet end of the rotating drum 41, they are periodically dispersed into the heated atmosphere provided by the flames emanating from the burners 55. The circulation of the coolant through the annular space 44 helps to prevent the particles from sticking to the surface of the drum. As the particles progress through the drum with periodic dropping through the drum during heat treatment, they are brought to a temperature at which at least partial nucleation of the titania crystals occurs in the glass. Upon completion of the heat treatment, the particles are discharged along the chute 58.

The modified form of the invention shown in FIGURE 4 is similar in many respects to that shown in FIGURE 1, except for the fact that the ribbon of frit is treated, rather than the particles of frit. In this embodiment, a smelter 61 has a discharge spout 62 delivering a molten stream 63 of the glass composition to quenching rolls 64 which are cooled by means of a coolant circulated through conduits 66. The resulting solidified ribbon 67 of frit is delivered between a pair of heaters 68 and 69 which may be gas fired, infrared heaters, electrically energized heaters, or the like. The transit time of the ribbon 67 between the heaters 68 and 69 is sufficient, at the temperatures reached, to provide nucleation of titania within the glass matrix. The heat treated ribbon emerges onto a receiving tray 71 associated with an oscillatory conveyor generally indicated at reference numeral 72 in the drawings. The tray includes a water cooled trough 73 which is cooled by introducing water or other cooling medium through an inlet 74 and withdrawing it through an outlet conduit 76. As in the device shown in FIGURE 1, the oscillatory conveyor 72 is actuated by a variable speed drive 77 operating in conjunction with a plurality of coil springs 78 and 79. Leaf springs 81, 82 and 83 are interposed between the oscillatory trough 73 and the frame to stabilize the motion of the trough. The heat treated ribbon in striking the oscillatory conveyor is broken up into particles 86 which particles are delivered to a discharge chute 87 ready for packing or storage.

From the foregoing, it will be understood that the methods and apparatus of the present invention provide a convenient means for a continuous production of treated titania opacified frit in a continuous manner. The heat retained in the frit from the quenching operation is utilized in order to reduce the amount of extraneous heat which must be supplied to the frit in order to heat treat it properly. Furthermore, the assemblies used in conjunction with this invention require only small amounts of additional equipment in addition to the equipment normally present in a fritting plant. It should be evident that various modifications can be made to the described embodiments without departing from the scope of the present invention.

We claim as our invention:

1. The method of making an opacified frit suitable for application by dry process enameling which comprises forming a molten mass of glass containing a titania opacifier, forming a sheet of solidified glass of said mass, breaking up the sheet into individual frit flakes and heat treating the frit flakes while dispersing them in air, the heat treatment being carried out at a temperature ranging from the softening point of the glass to 600° F. above the softening point for a time sufficient to cause formation of titania crystals in a matrix of glass.

2. The method of making an opacified frit suitable for application by dry process enameling which comprises forming a molten mass of glass containing a titania opacifier, forming a sheet of solidified glass of said mass, conveying the resulting sheet to a heat treating zone, fracturing said sheet into flakes, heat treating said flakes in said heat treating zone at a temperature ranging from the softening point of the glass to 600° F. above the softening point, perodically dispersing the individual flakes into the atmosphere of said heat treating zone, and continuing the heating and dispersing of said flakes until titania crystals are formed in the frit flakes.

3. The method of making an opacified frit suitable for application by dry process enameling which comprises forming a molten mass of glass containing a titania opacifier, forming a solidified sheet of glass of the molten mass, directing the sheet to a conveying station, heat treating the resulting sheet while being so conveyed at a temperature ranging from the softening point to 600° F. above the softening point for a time sufficient to cause at least partial nucleation of titania crystals within the glass, and thereafter subdividing the sheet into frit particles.

References Cited by the Examiner
UNITED STATES PATENTS

| | | | |
|---|---|---|---|
| 2,633,346 | 3/1953 | Stein | 263—21 |
| 2,840,363 | 6/1958 | Penrose | 263—21 |
| 3,083,505 | 4/1963 | Wynne | 65—104 X |
| 3,113,009 | 12/1963 | Brown et al. | 65—33 |
| 3,163,513 | 12/1964 | Brown | 65—33 |

DONALL H. SYLVESTER, *Primary Examiner.*

A. D. KELLOGG, *Assistant Examiner.*